Patented Dec. 14, 1948

2,456,368

UNITED STATES PATENT OFFICE 2,456,368

CALCIUM NICKEL PHOSPHATE-CHROMIUM OXIDE CATALYST

Edgar C. Britton and Andrew J. Dietzler, Midland, Mich., assignors to The Dow Chemical Company, Midland, Mich., a corporation of Delaware No Drawing. Original application March 4, 1946, Serial No. 651,985, now Patent No. 2,442,320, dated May 25, 1948. Divided and this application April 4, 1947, Serial No. 739,356

8 Claims. (Cl. 252—228.2)

This invention concerns an improved process and a new composite catalyst for the dehydrogenation of aliphatic mono-olefines having at least four carbon atoms in a carbon chain containing the olefinic linkage.

This application is a division of a copending application, Serial No. 651,985, filed March 4, 1946, now U. S. Patent No. 2,442,320, issued May 25, 1948, which is a continuation-in-part of another copending application, Serial No. 529,404, filed April 3, 1944, now U. S. Patent No. 2,442,319 issued May 25, 1948. In the parent application, Serial No. 529,404, we have disclosed a process and an exceptionally effective catalyst for the thermal dehydrogenation of such olefines. The catalyst consists essentially of a normal metal phosphate material composed of calcium and nickel chemically combined (in relative proportions of between 7.5 and 9.2 atoms of calcium per atom of nickel) with phosphate radicals. It is prepared by precipitation, under neutral or alkaline conditions, from an aqueous solution of soluble calcium and nickel salts in admixture with a water-soluble ortho-phosphate, e. g. orthophosphoric acid, or an ammonium or alkali metal phosphate. It is distinct in catalytic action from a mechanical mixture of preformed ortho-phosphates of calcium and nickel in the same relative proportions and is believed to contain the calcium and nickel ions in a regular and definite spacial relationship to one another. For convenience, it is hereinafter referred to as "calcium nickel phosphate." After being formed by precipitation under neutral or alkaline conditions, it is washed with water and dried. Prior to use as a dehydrogenation catalyst, it may advantageously be admixed, in powdered or granular form, with a lubricant such as graphite, or a vegetable or mineral oil, and be pressed into tablets of size convenient for such use. Thereafter the lubricant is removed by oxidation.

In the above-mentioned application, Serial No. 529,404, it is disclosed that a catalyst prepared as just described is exceptionally effective in catalyzing the thermal dehydrogenation at temperatures of from 600° to 750° C. of an olefine having at least four carbon atoms in a carbon chain containing the olefinic linkage, provided steam is present as a diluent in the pyrolysis mixture, and that it is highly selective for such purpose. For instance, the calcium nickel phosphate has little, if any, action in catalyzing the thermal dehydrogenation of olefines, such as ethylene, propylene, or isobutylene, which have fewer than four carbon atoms in the chain containing the olefinic linkage. It may be employed selectively to dehydrogenate an olefine such as n-butylene in the presence of ethylene, propylene, or isobutylene without causing appreciable dehydrogenation of the olefine having less than four carbon atoms in the unsaturated carbon chain of the molecule. When the catalyst is employed in dehydrogenerating an olefine having only four carbon atoms in the unsaturated carbon chain, the principal organic product is a conjugated diolefine, e. g. butadiene-1,3, or isoprene, etc. An olefine having more than four carbon atoms in the chain containing the olefinic linkage may be cyclized during treatment with the catalyst. For instance, the dehydrogenation of hexene-1 may be carried out to produce benzene.

During use in a dehydrogenation reaction, the catalyst gradually accumulates a small amount of carbonaceous or tarry organic material and loses its activity. When necessary, it may be reactivated by oxidation of the impurities accumulated thereon. This is best accomplished by passing an oxygen-containing gas such as air, or a vapor mixture of air and steam, over the catalyst at tempreatures between 450° and 700° C. In our application, Serial No. 529,404, we have mentioned that the time required for such reactivation operation may be shortened by admixing a minor amount of chromium oxide with the calcium nickel phosphate prior to compounding it into the form of tablets, but we have not specifically claimed either a mixture of chromium oxide and calcium nickel phosphate or a dehydrogenation process involving use of this catalytic mixture.

We have now discovered that chromium oxide, when admixed with the calcium nickel phosphate, has a number of other important effects. The resultant mixture is more active catalytically than the phosphate component alone. When the calcium nickel phosphate component is, of itself, of high catalytic activity, the chromium oxide causes a lowering of the minimum temperature necessary for the catalytic dehydrogenation of a reactive olefine, in some instances by as much as 100° C. below the temperature required when using the same phosphate alone at catalyst. In such instance, the mixture of chromium oxide and phosphate may cause excessive carbonization or other by-product formation if used at the same temperature as would be employed when effecting a dehydrogenation with the phosphate component alone, but is satisfactory in catalytic behavior at somewhat lower temperatures. In general, the mixtures of chromium oxide and calcium nickel phosphate are employed as dehydrogenation catalysts at temperatures below those at which as much as 5 per cent of the hydrocarbon material undergoes carbonization, and usually at temperatures exceeding by less than 150° C. the minimum temperature at which the catalytic dehydrogenation occurs at an appreciable rate. If, in any instance, excessive carbonization occurs during a dehydrogenation, the reaction temperature should be lowered. When used at a suitable temperature, the mixture of chromium oxide and calcium nickel phosphate has a catalytic behavior similar to, though more pronounced than, that of the phosphate alone, i. e. the mixture is highly effective in causing the dehydrogenation of mono-olefines having four or more carbon atoms in the unsaturated carbon chain of the molecule and is relatively inactive with regard to olefines such as ethylene, propylene or isobutylene which have a lesser number of carbon atoms in the unsaturated chain. When the olefine is one containing only four carbon atoms in the carbon chain, the catalytic dehydrogenation results in formation of a corresponding diolefine as the principal organic product. Olefines having more than four carbon atoms in the unsaturated carbon chain may be cyclized during treatment with the catalytic mixture, e. g. hexene-1 may be dehydrogenated in the presence of the catalyst to form benzene.

The chromium oxide may also be added to precipitated calcium nickel phosphate which, because of carelessness in preparing or washing the same, or because of an excessively high ratio of calcium to nickel therein, or for other reasons, is of low catalytic activity, to obtain a mixture which is satisfactorily active. Thus, calcium nickel phosphate of low catalytic actvity and having an atomic ratio of calcium to nickel as great as 12 to 1 or higher may be rendered satisfactorily active by admixing chromium oxide therewith. Accordingly, for the purpose of this invention it is not as important that the calcium nickel phosphate be prepared with the high degree of care and skill that is required when the phosphate alone is to be used as a catalyst.

Chromium oxide, in admixture with the calcium nickel phosphate, has a further effect of maintaining and prolonging the catalytic activity of the mixture beyond that obtainable when using the phosphate component alone under otherwise similar conditions. The chromium oxide also has the effect of decreasing the time required, at a given temperature and using a given concentration of oxygen, for reactivation of the used catalyst. Because of these factors, the mixture of chromium oxide and calcium nickel phosphate may be maintained in active service as a dehydrogenation catalyst a greater proportion of the total operating time than may the phosphate component alone under a set of operating conditions which are otherwise similar. In other words, the productive capacity of a given dehydrogenation reactor may be increased by employing as the catalyst therein a mixture of chromium oxide and calcium nickel phosphate rather than the phosphate alone.

We have also found that precipitated calcium nickel phosphate having an atomic ratio of calcium to nickel somewhat lower than is permitted in our copending application, Serial No. 529,404, e. g. as low as 6, may successfully be used, in admixture with a lesser amount of chromium oxide, as a dehydrogenation catalyst. Upon reducing said atomic ratio value below 7.5, the operating conditions, e. g. of temperature, for successful use of the phosphate as a dehydrogenation catalyst become far more critical and the tendency toward occurrence of carbonization, or other by-product formation, increases. A phosphate having such atomic ratio value of less than 7.5, when used alone as a dehydrogenation catalyst, tends to become fouled and, consequently, less active catalytically soon after being placed in service so that operation with the same involves relatively short periods of dehydrogenation and unduly frequent reactivation operations. However, by admixing chromium oxide with a calcium nickel phosphate, fouling during dehydrogenation occurs less readily or rapidly and the catalytic mixture can be maintained in service for satisfactorily long periods, e. g. 15 minutes or longer, before reactivation becomes necesary. Even when using chromium oxide in admixture with the phosphate, it is preferred that the latter have a calcium-nickel atomic ratio of at least 7.5.

In summary of the several advantages just discussed, it may be stated that chromium oxide, in admixture with the precipitated calcium nickel phosphate, has the effects of: (1) causing an increase in catalytic activity over that of the phosphate component alone; (2) permitting satisfactory employment of calcium nickel phosphates containing atomic ratios of calcium to nickel ranging from 6 to 12 or higher, which range of values extends outside that which may satisfactorily be used when the phosphate is to be employed alone as a catalyst; (3) rendering less critical the skill and technique involved in making the calcium nickel phosphate; (4) lowering the minimum temperature at which the catalytic dehydrogenation reaction may be carried out below that required when using the phosphate component alone as a catalyst; (5) prolonging the catalytic activity of the mixture of chromium oxide and calcium nickel phosphate beyond that of the phosphate component alone; and (6) shortening the period necessary under a given set of conditions for reactivation of the used catalytic mixture below that required when employing the phosphate component alone as catalyst.

Except for the fact that the atomic ratio of calcium to nickel in the precipitated calcium nickel phosphate may be varied outside the range required in our copending application, Serial No. 529,404, and that the activity of the catalytic mixture of this invention is less dependent upon the skill observed in preparing and handling said phosphate, the procedure in preparing the calcium nickel phosphate ingredient of the catalytic mixture provided by this invention is as described in said copending application. Briefly stated, it involves preparing an aqueous solution containing soluble calcium and nickel compounds, e. g. nitrates, chlorides, or bromides, etc., of said metals, in relative proportions corresponding to between 6 and 12, preferably between 7.5 and 12, atoms of calcium per atom of nickel. Such solution may be admixed with an aqueous solution of a water-soluble phosphate, such as an ammonium, sodium or potassium phosphate, while maintaining the resultant mixture in a neutral, or preferably alkaline, condition either by initially having present in the phosphate solution sufficient alkali for the purpose, or by adding an alkali during the operation of admixing the two solutions to cause precipitation of the calcium nickel phosphate. Ammonia is preferred as the alkaline agent for obtaining the neutral to alkaline condition, but basic nitrogen compounds such as ethylamine, diethylamine, or propylamine, or other alkalies such as sodium or potassium hydroxide, etc., can be used, particularly in conjunction with ammonia or an ammonium salt. The soluble phosphate starting material is preferably employed in amount slightly exceeding the chemical equivalent of the calcium and nickel salts with which it is to be reacted, but it may be used in smaller, or in considerably larger, proportions if desired. In any instance, the precipitate consists substantially of a normal phosphate of calcium and nickel. After completing the precipitation, the liquor is separated, e. g. by filtration or decantation, and the precipitate is washed with water, and dried. In practice, the precipitated phosphate is preferably warmed, e. g. to 50° C. or above, together with the mother liquor, or with water, prior to being separated, washed and dried. Such warming operation appears to facilitate removal of an undesired soluble impurity from the phosphate.

As procedure alternative to that just described, one may first form an aqueous solution of the calcium and nickel salts together with orthophosphoric acid in the relative proportions above stated and admix with the solution sufficient alkali, preferably ammonia, to render the mixture neutral or alkaline and thus cause precipitation of the calcium nickel phosphate.

In order to obtain calcium nickel phosphate in a form of good catalytic activity, it is important that the mixture be neutral or alkaline, e. g. of a pH value from 7 to 9 and preferably about 8, when precipitation of the calcium nickel phosphate is completed. As hereinbefore mentioned, ammonia is most satisfactorily used as the alkaline agent for obtaining the neutral to alkaline condition, presumably because of its tendency to form a soluble nickel-ammonia complex radical rather than causing immediate formation of nickel hydroxide, but other alkalies can be used.

A chromium oxide, usually $Cr_2O_3$, may be added to the wet precipitate, e. g. before or after washing the phosphate with water. However, in practice, we prefer to separate, wash, dry and, when necessary, pulverize the calcium nickel phosphate prior to admixing the chromium oxide therewith. The phosphate is usually dried at temperatures between 60° and 150° C. Admixture of the chromium oxide with the preformed calcium nickel phosphate may be accomplished by adding chromium oxide powder to the powdered or granular phosphate and agitating the mixture, or by adding a chromium salt to the phosphate and subsequently hydrolyzing or decomposing the salt to form the chromium oxide in situ. For instance, the phosphate may be wetted with an aqueous solution of chromium nitrate or chromium oxalate and the resultant mixture may be dried, preferably at a temperature below 90° C., and thereafter be roasted to form a deposit of chromium oxide on the granules of the phosphate. Other ways of forming intimate admixtures of the chromium oxide and phosphate will be apparent. The invention is not restricted as to the procedure employed in forming the mixture.

In most instances only a small proportion, e. g. from 0.05 to 5 per cent by weight, of chromium oxide need be present in admixture with the phosphate in order to obtain the benefits of the invention, but the chromium oxide may be used in larger proportions if desired. When the phosphate alone is of low catalytic activity, the chromium oxide is usually employed in somewhat larger proportion than when the phosphate alone is of high activity. However, a mixture of highly active calcium nickel phosphate together with 30 per cent by weight of chromium oxide has been used as a catalyst for the dehydrogenation of normal butylenes to form butadiene-1.3. In general, the chromium oxide is employed in amount corresponding to less than 50 per cent of the combined weight of the same and the phosphate.

The finely divided mixture of chromium oxide and calcium nickel phosphate can be used directly as a dehydrogenation catalyst. However, it is preferably treated with a lubricant, e. g. graphite, or an oil, and pressed into the form of pellets, tablets or granules of size more suitable for use. Usually the tablets or granules are of from $\frac{1}{16}$ to ½ inch thickness or diameter.

In dehydrogenating an olefine in accordance with the invention, a reaction chamber is charged with the granular catalyst and the lubricant is removed by passing air, or preferably a mixture of about equal volumes of air and steam, through the catalyst bed at a high temperature, e. g. 450° to 750° C. When the lubricant is a substance capable of being vaporized, e. g. a mineral or vegetable oil, the step of treating the catalyst with air may be preceded by one of vaporizing lubricant from the heated catalyst by passing an inert gas such as steam, nitrogen, or carbon dioxide over the same.

After freeing the catalyst of lubricant, the catalyst bed is swept free of air with steam and is heated to the desired reaction temperature, preferably by passing superheated steam through the same. A mixture of steam and the olefine reactant, e. g. butylene, amylene, or a hexylene, having at least four carbon atoms in the unsaturated carbon chain of the molecule, is passed through the catalyst bed, usually at a reaction temperature between 500° and 750° C. and preferably between 550° and 700° C., although temperatures lower or higher than those just mentioned may in some instances be employed. The usual procedure is to pass the olefine-containing gas into admixture with steam which has been superheated to about 600° C. or above, i. e. to a temperature sufficient so that the resultant mixture is at the desired reaction temperature, and to pass the vapor mixture through the bed of catalyst. However, the heat may be supplied in other ways such as by forming the steam and hydrocarbon mixture at a lower temperature and passing it through a preheater to bring it to the reaction temperature, or by externally heating the catalyst chamber itself. The yield of the dehydrogenation product is usually highest when from 10 to 20 volumes of steam are employed per volume of the olefine-containing hydrocarbon vapor, but the steam may be used in smaller or larger proportions. The rate of vapor flow through the catalyst chamber may be varied widely, but in practice usually corresponds to between 100 and 700 liters of the olefine reactant (expressed as at 0° C., and 760 millimeters pressure) per liter of catalyst bed per hour. The dehydrogenation reaction ususally is carried out at atmospheric pressure or thereabout, but it may be accomplished at sub-atmospheric or at super-atmospheric pressure.

Vapors flowing from the catalyst chamber are ordinarily passed through heat exchangers and other cooling devices to condense the water and hydrocarbon products. The latter may be separated and purified in known ways, e. g. by fractional distillation or selective extraction operations, etc.

During use in the dehydrogenation reaction, the catalytic mixture gradually accumulates a small amount of carbon or non-volatile organic material, and becomes less active. Accordingly, flow of the hydrocarbon starting material is periodically interrupted and air, admixed usually with about an equal volume of steam, is blown through the catalyst bed, e. g. at temperatures between 450° and 700° C. and preferably at approximately the dehydrogenation temperature, to oxidize and remove the carbonaceous or organic material and thus reactivate the catalyst. The flow of air is then interrupted, the catalyst chamber is swept free of air with steam, and introduction of the olefine-containing starting material in admixture with steam is resumed.

As hereinbefore mentioned, the admixture of chromium oxide with the calcium nickel phosphate has an effect of prolonging the active life of such phosphate in the dehydrogenation stage of each cycle of operations and also of reducing the time involved in reactivating the catalytic mixture below that required under otherwise similar conditions when using the calcium nickel phosphate alone as the catalyst. Accordingly, the chromium oxide ingredient of the catalyst mixture has an effect of increasing considerably the productive capacity of the process when using a catalyst bed of given size. It usually also causes an increase in catalytic activity of the mixture over that of the calcium nickel phosphate ingredient alone.

The process, as just described, may be applied in dehydrogenating butylene-1, or butylene-2, to form butadiene-1,3; in dehydrogenating iso-amylene to form isoprene; or in dehydrogenating hexene-1 to form benzene; etc. It may be applied with great advantage in producing conjugated diolefines from corresponding mono-olefines having four carbon atoms in the unsaturated carbon chain of the molecule.

The following examples describe a number of ways in which the principle of the invention has been applied and illustrate certain of its advantages, but are not to be construed as limiting the scope of the invention.

EXAMPLE 1

The purpose of this example is to illustrate a procedure employed in preparing calcium nickel phosphate. Approximately 20.9 pounds of a dilute aqueous ammonia solution (containing 372 grams, or 21.9 gram moles, of $NH_3$) was added with stirring to approximately 200 pounds of a dilute aqueous solution of ortho-phosphoric acid, which latter solution contained 665 grams, or 6.78 gram moles, of $H_3PO_4$. To the resultant ammonium phosphate solution, approximately 82.8 pounds of an aqueous solution of 986 grams (8.88 gram moles) of calcium chloride and 245 grams (1.02 gram moles) of nickel chloride, i. e. $NiCl_2 \cdot 6H_2O$, was added over a period of two hours. During this treatment, the mixture became flocculent due to formation of insoluble calcium nickel phosphate. After adding the ingredients, stirring was continued for one-half hour. The mixture was then allowed to stand for about six hours, during which period the calcium nickel phosphate settled as a distinct lower layer. The supernatant liquor was removed by decantation, and the residue was repeatedly washed with water until the washings were substantially free of soluble nickel compounds and chlorides. The remaining mixture of water and calcium nickel phosphate was filtered, whereby the phosphate was obtained in the form of a gelatinous filter cake. The latter was dried by heating the same at 60° C. for 12 hours and thereafter at 130° C. for 24 hours. The product, which was a hard yellow gel, was ground to a particle size capable of passing a 28 mesh screen. The product is normal calcium nickel phosphate having an atomic ratio of calcium to nickel ions of approximately 8.7. It is suitable for use as a component of the catalytic mixtures provided by the invention.

By varying the relative proportions of calcium and nickel salts in the starting materials, but otherwise operating as just described, normal calcium nickel phosphates having other atomic ratios of calcium to nickel ions may readily be prepared. Accordingly, in the examples which follow the calcium nickel phosphates will be identified by statements as to the atomic ratio of calcium to nickel therein, it being understood that they are normal phosphates which, unless otherwise stated, may be prepared by procedure similar to that just described. In instances in which departures from the foregoing procedure resulted in normal calcium nickel phosphates of low catalytic activity, this fact will be mentioned.

EXAMPLE 2

A portion of a batch of calcium nickel phosphate, containing approximately 9 atoms of calcium per atom of nickel, but of sub-normal catalytic activity due apparently to the mode of washing mother liquor therefrom during preparation of the same, was admixed in dry powdered form with a small amount of powdered chromium sesquioxide ($Cr_2O_3$) to form an intimate mixture containing approximately 1 per cent by weight of the chromium oxide. Powdered graphite was added with stirring to form a substantially uniform mixture containing approximately 2 per cent by weight of graphite. The resultant mixture was pressed to form pellets of approximately ⅛ inch diameter. Another portion of the same batch of calcium nickel phosphate was admixed directly with 2 per cent by weight of graphite and pressed into pellets of similar size and shape, but which pellets were, of course, free of chromium oxide. The two kinds of pellets were tested under similar conditions as catalysts for the dehydrogenation of normal butylenes to produce butadiene-1.3. In each experiment, the pellets were heated to a temperature of about 650° C. in contact with steam and thereafter at 650° C. in a vapor stream of about equal volumes of air and steam, whereby the graphite was removed by oxidation. The pellets were then charged into a tubular chamber of one inch internal diameter to form a bed having a volume of approximately 150 cubic centimeters. The bed was heated to a temperature of 650° C. and was swept free of air with steam. A mixture of one volume of normal butylenes, principally butylene-1, and about 20 volumes of steam was passed through the bed at a temperature of about 650° C., and at a rate corresponding to approximately 300 liters of butylenes (expressed as at 0° C. and 760 millimeters pressure) per liter of catalyst bed per hour. Vapors flowing from the bed of catalyst were passed successively through a water-cooled condenser and a trap cooled with ice to condense and remove most of the water vapor, and then through a bed of solid calcium chloride and finally through a trap cooled with a solid carbon dioxide and acetone mixture where hydrocarbons having three of four carbon atoms in the molecule were condensed and collected. The gases remaining uncondensed were collected and the volume thereof measured. The hydrocarbon condensate was weighed and analyzed. These operations of passing the mixture of steam and butylenes through the bed of catalyst and of collecting the products were carried out over a period of thirty minutes. The flow of butylenes was then interrupted and the bed was flushed free of hydrocarbon vapors by passing steam alone therethrough for about two minutes. Air was then admixed with the inflowing steam and passed at a rate corresponding to 700 liters of air (expressed as at 0° C. and 760 millimeters pressure) per liter of catalyst bed per hour. Steam and air were passed through the bed for a period of 30 minutes, during which time the bed was maintained at a temperature of about 650° C. The flow of air was then discontinued and the bed was swept free of air with steam. The foregoing operations of employing the catalyst for the dehydrogenation of butylenes and thereafter of reactivating the catalyst by treatment with air constitute a single cycle of the process, which cycle was repeated many times. The aforementioned operations of collecting, measuring and analyzing the products were performed on materials collected in only certain of the cycles, which cycles were selected so that the data would be representative of the process as a whole. The following table identifies each catalyst by stating whether it contained chromium oxide. It identifies the respective cycles of operation with a given catalyst by stating the number of cycles since starting the process. The table gives, for each of a number of representative cycles with each catalyst, the amount of hydrocarbon condensate, expressed as percent of the weight of butylenes employed as starting material in the cycle, and the mole per cent of butadiene-1.3 in the hydrocarbon condensate. It also gives, as liters of gas at 0° C. and 760 millimeters absolute pressure, the amount of gaseous material which remained uncondensed after passage through the trap cooled with the mixture of solid carbon dioxide and acetone.

Table I

| Cycle No. | Results with Catalyst Free of Chromium Oxide | | | Results with Catalyst Containing Chromium Oxide | | |
|---|---|---|---|---|---|---|
| | HC Condensate as Wt. Per Cent of $C_4H_8$ in Feed | $C_4H_6$ in HC Condensate, Mole Per Cent | Uncondensed Gas, Liters | HC Condensate as Wt. Per Cent of $C_4H_8$ in Feed | $C_4H_6$ in HC Condensate, Mole Per Cent | Uncondensed Gas, Liters |
| 1 | 82.0 | 39.0 | 20.0 | 82.8 | 45.2 | 25.6 |
| 2 | 85.6 | 38.6 | 18.0 | 86.5 | 45.2 | 23.0 |
| 3 | 85.6 | 38.4 | 18.0 | 84.9 | 45.0 | 21.1 |
| 18 | 84.0 | 32.8 | 14.5 | | | |
| 19 | 86.7 | 32.4 | 14.5 | | | |
| 20 | 85.5 | 32.0 | 13.5 | | | |
| 21 | 86.0 | 32.0 | 14.0 | 82.3 | 43.0 | 19.6 |
| 22 | | | | 84.9 | 43.8 | 19.5 |
| 23 | | | | 84.8 | 42.6 | 18.6 |
| 24 | | | | 84.7 | 43.2 | 18.5 |
| 26 | | | | 85.5 | 42.4 | 18.2 |
| 27 | | | | 81.4 | 42.0 | 18.0 |
| 40 | 84.4 | 29.4 | 13.0 | | | |
| 41 | 85.8 | 29.4 | 12.0 | | | |
| 42 | 85.5 | 29.4 | 12.5 | | | |
| 45 | | | | 83.0 | 43.0 | 18.2 |
| 50 | | | | 84.7 | 43.2 | 17.3 |
| 73 | | | | 85.7 | 42.0 | 16.5 |
| 141 | | | | 83.7 | 40.2 | 16.2 |
| 188 | | | | 85.3 | 40.4 | 16.1 |

In the above table it is shown that during use of calcium nickel phosphate alone as the catalyst, the mole fraction of butadiene decreased from an initial value of 39 per cent to a value of 29.4 per cent in the forty-second cycle of operations and that the formation of uncondensed gas (largely hydrogen) also decreased. Taking the concentration of butadiene in the hydrocarbon condensate as a measure of the activity of the catalyst, the latter was about 75 per cent as active in the forty-second cycle as when first employed. However, in the experiment using the mixture of chromium oxide and calcium nickel phosphate as catalyst, the concentration of butadiene in the hydrocarbon condensate was 45.2 mole per cent, i. e. considerably higher than when using the phosphate alone as catalyst, and in the 188th cycle of operations it had decreased only to a value of 40.4 per cent, i. e. in this last cycle the catalyst was 89.5 per cent as active as when first prepared. It is evident that the chromium oxide both increased and prolonged the catalytic activity.

EXAMPLE 3

Calcium nickel phosphate containing 9.2 atoms of calcium per atom of nickel, but of sub-normal catalytic activity apparently because of formation and precipitation of the phosphate in a medium of excessively great alkalinity, was treated with chromium oxide to form a mixture containing approximately 0.5 per cent by weight of chromium oxide. The mixture was treated with graphite and pressed into pellets as in Example 2. Another portion of the same batch of calcium nickel phosphate was admixed directly with graphite and pressed to form pellets free of chromium oxide. The two kinds of pellets were used in separate experiments for the dehydrogenation of normal butylenes to form butadiene, as in Example 2. Table II gives the results of the experiments, expressed in terms similar to those employed in Example 2.

atomic ratio of calcium to nickel of 10.37 and which, apparently because of this high ratio, was of sub-normal catalytic activity was pelleted and tested, both alone and in intimate admixture with 2 per cent by weight of chromium oxide, as a catalyst for the dehydrogenation of normal butylenes to form butadiene. The following table gives the results of the two experiments in terms similar to those employed in Example 2.

*Table III*

| Cycle No. | Results with Catalyst Free of Chromium Oxide | | | Results with Catalyst Containing Chromium Oxide | | |
|---|---|---|---|---|---|---|
| | HC Condensate as Wt. Per Cent of $C_4H_8$ in Feed | $C_4H_6$ in HC Condensate, Mole Per Cent | Uncondensed Gas, Liters | HC Condensate as Wt. Per Cent of $C_4H_8$ in Feed | $C_4H_6$ in HC Condensate, Mole Per Cent | Uncondensed Gas, Liters |
| 1 | 83.0 | 8.4 | 5.7 | 83.4 | 35.4 | 14.6 |
| 2 | 84.6 | 6.4 | 4.3 | 85.0 | 35.6 | 14.1 |
| 3 | | | | 82.5 | 29.2 | 11.1 |
| 4 | | | | 87.2 | 30.4 | 11.2 |
| 5 | | | | 84.8 | 31.4 | 11.4 |
| 6 | | | | 86.5 | 29.8 | 11.1 |
| 7 | | | | 86.5 | 30.2 | 11.4 |

EXAMPLE 5

Calcium nickel phosphate having a calcium to nickel atomic ratio of 9.65 was employed in pellet form as a catalyst for the production of butadiene from normal butylene. The phosphate initially was of high catalytic activity, but its activity decreased during use. In the fiftieth cycle of the alternate butylene-dehydrogenation and catalyst-reactivation operations involved in the process, there was obtained from the products a hydrocarbon condensate in amount correponding to 84.1 per cent of the weight of the butylenes

*Table II*

| Cycle No. | Results with Catalyst Free of Chromium Oxide | | | Results with Catalyst Containing Chromium Oxide | | |
|---|---|---|---|---|---|---|
| | HC Condensate as Wt. Per Cent of $C_4H_8$ in Feed | $C_4H_6$ in HC Condensate, Mole Per Cent | Uncondensed Gas, Liters | HC Condensate as Wt. Per Cent of $C_4H_8$ in Feed | $C_4H_6$ in HC Condensate, Mole Per Cent | Uncondensed Gas, Liters |
| 1 | 83 | 38.0 | 19.0 | 81.3 | 33.4 | 26.9 |
| 2 | 84.6 | 37.6 | 18.4 | 84.6 | 34.2 | 26.7 |
| 3 | 85.2 | 37.2 | 17.8 | 86.4 | 33.8 | 24.6 |
| 21 | 87.0 | 29.4 | 12.7 | 82.3 | 33.6 | 21.8 |
| 22 | 85.0 | 29.2 | 12.9 | 84.1 | 33.2 | 20.4 |
| 23 | 86.4 | 28.4 | 12.3 | 86.5 | 32.8 | 18.1 |

At the start of these runs, the phosphate alone appeared to be somewhat more active than the mixture of phosphate and chromium oxide in producing butadiene. However, the phosphate alone rapidly decreased in activity, whereas the activity of the mixture of phosphate and chromium oxide did not decrease appreciably. After the twentieth cycle of operations, the mixture was more active than the phosphate alone. The decrease in activity resulting from addition of the chromium oxide, which was apparent at the start of the experiments, is believed to have been due to an increase in by-product formation (which may be overcome by lowering the dehydrogenation temperature) rather than to an actual decrease in catalytic activity.

EXAMPLE 4

By procedure similar to that described in Example 2, calcium nickel phosphate having an employed in said cycle. This hydrocarbon condensate contained only 27.2 mole per cent of butadiene. A 131 gram portion of pellets of the same batch of calcium nickel phosphate, but which portion had lost a considerable part of its catalytic activity during use as a catalyst for the dehydrogenation of butylenes, was treated with a solution of 6.9 grams of chromium nitrate, $Cr(NO_3)_3 \cdot 9H_2O$, in 55 cubic centimeters of water. The mixture was stirred and nearly all of the solution was absorbed by the pellets. The pellets were dried by heating the same at 130° C. for 20 hours. They were then roasted at a temperature of 650° C. for 2 hours so as to decompose the chromium nitrate and form the corresponding oxide. The treated pellets contained approximately 1 per cent of chromium oxide. They were employed as a catalyst for the dehydrogenation of normal butylenes, the procedure being similar to that described in Example 2. Table IV gives the results obtained.

Table IV

| Cycle No. | Results | | |
|---|---|---|---|
| | HC Condensate as Wt. per cent of $C_4H_8$ in Feed | $C_4H_6$ in HC Condensate, Mole per cent | Uncondensed Gas, Liters |
| 1 | 79.8 | 30.6 | 29.7 |
| 2 | 83.4 | 32.6 | 20.4 |
| 5 | 80.8 | 36.4 | 21.7 |
| 6 | 87.1 | 36.8 | 17.9 |
| 7 | 86.7 | 36.4 | 15.7 |
| 25 | 83.3 | 40.2 | 19.2 |
| 26 | 85.3 | 39.2 | 16.3 |
| 27 | 85.9 | 39.6 | 15.4 |
| 29 | 84.0 | 39.2 | 15.4 |
| 30 | 85.1 | 38.2 | 14.6 |
| 31 | 86.5 | 37.6 | 13.9 |
| 49 | 81.3 | 38.0 | 14.3 |
| 51 | 85.2 | 37.2 | 12.8 |
| 53 | 84.7 | 36.4 | 12.1 |

In Table IV it will be noted that the concentration of butadiene in the hydrocarbon condensate increased during the first 25 cycles of operation and thereafter very gradually decreased. It appears that at the reaction temperature employed the chromium oxide not only increased the catalytic activity, but also caused an increase in by-product formation, over that obtainable under similar conditions with the phosphate alone, but that during use of the catalytic mixture the tendency toward by-product formation decreased rapidly, whereas the catalytic action in causing the formation of butadiene decreased very gradually. The overall effect during the first 25 cycles of operation was an increase in the yield of butadiene.

EXAMPLE 6

This example is presented for purpose of illustrating the active life of a mixture of calcium nickel phosphate and chromium oxide in a process for dehydrogenating normal butylenes to form butadiene-1.3. Calcium nickel phosphate having a calcium to nickel atomic ration of 9.1, and which of itself was of good catalytic activity, was admixed with one per cent by weight of chromium oxide and the mixture was pelleted. The procedure in forming the pellets and in dehydrogenating normal butylenes is the presence of the catalyst pellets was as described in Example 2. It may be mentioned, however, that the hydrocarbon mixture used as a starting material was one having the following Podbielniak analysis: normal butylenes, 84.0 mole per cent; butanes, 8.6 mole per cent; butadiene, 5.8 mole per cent; isobutylene, 1.6 mole per cent. Products collected in the 35th cycle of the dehydrogenation process, and also in the 425th cycle, were measured and analyzed by the Podbielniak method. They had the following respective analyses:

From the data collected, calculations were made for each of said cycles as to the proportion of the normal butylenes in the feed mixture which were consumed in the reaction and as to the yield of butadiene, both on a basis of the quantity of normal butylenes in the feed mixture and on a basis of the butylenes consumed. These values are given in the following table.

Table VI

| Cycle No. | $C_4H_8$ Consumed, Per Cent | Per Cent Yield of $C_4H_6$ Based On— | |
|---|---|---|---|
| | | $C_4H_8$ in Feed | $C_4H_8$ Consumed |
| 35 | 54.4 | 39.05 | 71.8 |
| 425 | 47.1 | 36.61 | 77.7 |

It will be seen that the activity of the catalytic mixture had decreased only moderately in the 425 cycles of operations, that the slight decrease in activity of the mixture was accompanied by an increase in the yield of butadiene, based on the butylenes consumed, and that at the end of the 425th cycle the catalytic mixture remained highly active and suitable for further use in the process.

EXAMPLE 7

Two experiments were carried out using as a catalyst pellets of calcium nickel phosphate, containing an average of 8.64 atoms of calcium per atom of nickel, intimately admixed with 10 per cent by weight of chromium oxide. The phosphate component was, of itself, an active catalyst for the dehydrogenation of normal butylenes to form butadiene-1.3, and as hereinbefore mentioned, is satisfactory for such purpose when used alone as a catalyst at reaction temperatures between 600° and 750° C. In one experiment, a vapor mixture of 36.4 grams of a $C_4$ fraction of cracked-oil gas (containing about 84.4 per cent by weight of normal butylenes, about 7.8 per cent of butanes, 4.8 per cent of butadiene and a minor amount of isobutylene) and 180 grams of steam was passed at a temperature of 650° C. during a period of 30 minutes through a 150 cubic centimeter bed of the pellets of the phosphate and chromium oxide mixture. Vapors flowing from the bed were cooled to condense the steam and the remaining vapors were dried and passed through a trap cooled with a mixture of acetone and solid carbon dioxide to a temperature of about −80° C. for the purpose of condensing and collecting in the trap hydrocarbons having from 3 to 4 carbon atoms in the molecule. As material flowing through the trap without condensation, there was obtained 82.7 liters (measured at room temperature and atmospheric pressure) of gaseous products. Only a very small amount of material condensed and collected in the trap. It was evident that very little butadiene was formed and that the principal products were gases of lower Table V

| Cycle No. | Products Contain Mole Per Cent of— | | | | | | | | | | | | | |
|---|---|---|---|---|---|---|---|---|---|---|---|---|---|---|
| | $C_4H_6$ | Normal $C_4H_8$ | $H_2$ | $C_4H_{10}$ | Iso-$C_4H_8$ | $H_2C{=}CH{-}C{\equiv}CH$ | $C_5$+Some $C_4$ Hydrocarbons | $C_3$ Hydrocarbons | $C_2H_6$ | $C_2H_4$ | $C_2H_2$ | $CH_4$ | $CO_2$ | $CO$ |
| 35 | 23.52 | 23.62 | 38.54 | 3.90 | 0.40 | 0.26 | 0.97 | 1.19 | 1.52 | 0.98 | 0.05 | 0.33 | 3.04 | 1.68 |
| 425 | 25.48 | 30.94 | 30.40 | 5.27 | 0.71 | 0.37 | 0.39 | 1.02 | 0.89 | 0.73 | 0.00 | 1.65 | 2.05 | 0.09 | boiling points. In the other experiment, a vapor mixture of 38.8 grams of the C₄ fraction of cracked-oil gas and 170 grams of steam was passed at a temperature of 500° C. during a period of 30 minutes through a 150 cubic centimeter bed of catalyst pellets of the same composition as those used in the experiment just described. Vapors flowing from the catalyst bed were cooled to condense the steam and the remaining vapors were dried and passed through a trap cooled to about —80° C. with a mixture of acetone and solid carbon dioxide. Within the trap there was collected 34.9 grams of a hydrocarbon condensate which contained 10 mole per cent of butadiene. As material flowing through the trap without being condensed, there was obtained 2.65 liters of gas. These experiments illustrate the advantage of lowering the temperature for the dehydrogenation reaction in an instance in which the catalytic mixture is too active at the reaction temperature normally employed when using the phosphate component alone as catalyst.

EXAMPLE 8

Two experiments were carried out using, as a catalyst, pellets of calcium nickel phosphate, containing an average of 8.64 atoms of calcium per atom of nickel, intimately admixed with 30 per cent by weight of chromium oxide. The phosphate component possessed, of itself, a high catalytic activity. In one experiment, a vapor mixture of 39.82 grams of a C₄ fraction of cracked-oil gas (composed of 33.62 grams of normal butylenes, 3.09 grams of butanes, 1.92 grams of butadiene and 1.19 grams of isobutylene) and 185 grams of steam was passed at a temperature of about 575° C. and over a period of 30 minutes through a 150 cubic centimeter bed of the catalyst. The products were condensed as in the preceding example. There was obtained a hydrocarbon condensate containing 10.51 grams of butadiene and 21.79 grams of unreacted normal butylenes. In other words, 11.83 grams, or 35.19 per cent, of the butylenes were consumed with formation of 8.59 grams of butadiene. The yield of butadiene was 26.5 per cent, based on the butylenes in the starting materials, or 75.3 per cent, based on the butylenes consumed. In the other experiment, a vapor mixture of 38.33 grams of C₄ fraction of cracked-oil gas (containing 32.36 grams of normal butylenes, 2.97 grams of butanes, 1.85 grams of butadiene, and 1.14 grams of isobutylene) and 180 grams of steam was passed at a temperature of 600° C. during a period of 30 minutes through the same bed of catalyst and hydrocarbon products were condensed as in the first experiment. The hydrocarbon condensate obtained by cooling the products contained 12.37 grams of butadiene and 17.37 grams of normal butylenes. Accordingly, 14.99 grams or 46.3 per cent, of the normal butylenes employed were consumed with formation of 10.52 grams of butadiene. The yield of butadiene was 33.8 per cent of theoretical, based on the normal butylenes in the feed mixture, or 72.8 per cent, based on the normal butylenes consumed.

EXAMPLE 9

A vapor mixture of 176 grams of steam and 37.6 grams of a C₄ fraction of cracked-oil gas (containing 84.5 per cent by volume of normal butylenes, 5 per cent of butadiene, 7.5 per cent of butanes and 3 per cent of isobutylene) was passed at a temperature of 600° C. and at approximately atmospheric pressure in a period of 30 minutes through a 150 cubic centimeter bed of a catalyst in the form of pellets of about ⅛ inch diameter. The catalyst pellets consisted of an intimate mixture of approximately 95 per cent by weight calcium nickel phosphate containing 6 atoms of calcium per atom of nickel together with 5 per cent of chromium sesquioxide. Vapors flowing from the bed of catalyst were passed through a cooling device to condense and remove steam, then dried, and thereafter passed through a trap cooled with a mixture of acetone and solid carbon dioxide where hydrocarbons having 3 and 4 carbon atoms in the molecule were condensed. Approximately 12.7 liters of gas (as measured at room temperature and atmospheric pressure) passed through the trap without condensing. As the hydrocarbon condensate, there was obtained 32.1 grams of hydrocarbons containing 35.6 mole per cent of butadiene.

Other modes of applying the principle of the invention may be employed instead of those explained, change being made as regards the method or compositions herein disclosed, provided the steps or ingredients stated by any of the following claims or the equivalent of such stated steps or ingredients be employed.

We therefore particularly point out and distinctly claim as our invention:

1. An intimate mixture of a normal calcium nickel phosphate material, formed by precipitation under neutral to alkaline conditions from a solution of a water-soluble phosphate and water-soluble calcium and nickel salts, which calcium nickel phosphate material contains between 6 and 12 atoms of calcium per atom of nickel, and a lesser amount by weight of chromium oxide, said mixture being effective as a catalyst for the dehydrogenation of an aliphatic mono-olefine having at least four carbon atoms in the unsaturated carbon chain of the molecule.

2. An intimate mixture of a normal calcium nickel phosphate material, formed by precipitation under neutral or alkaline conditions from a solution of a water-soluble phosphate and water-soluble calcium and nickel salts, which calcium nickel phosphate material contains between 7.5 and 12 atoms of calcium per atom of nickel, and a lesser amount by weight of a chromium oxide, said mixture being effective as a catalyst for the dehydrogenation of an aliphatic mono-olefine having at least four carbon atoms in the unsaturated carbon chain of the molecule.

3. A catalytic mixture, as described in claim 2, wherein the calcium nickel phosphate material is one formed by precipitation from an aqueous solution of a soluble ortho-phosphate and soluble calcium and nickel salts in the presence of a basic nitrogen compound in amount such that upon completion of the precipitation the aqueous mixture is of a pH value between 7 and 9.

4. A catalytic mixture, as described in claim 2, wherein the calcium nickel phosphate material is one formed by precipitation from an aqueous solution of a soluble ortho-phosphate and soluble calcium and nickel salts in the presence of ammonia in amount such that upon completion of the precipitation the aqueous mixture is of a pH value between 7 and 9.

5. A catalytic mixture, as described in claim 2, containing chromium oxide in amount corresponding to at least 0.05 and not exceeding 30 per cent of the combined weight of the same and the calcium nickel phosphate material.

6. A catalytic mixture, as described in claim 2, containing chromium oxide in amount corresponding to at least 0.05 and not exceeding 5 per cent of the combined weight of the same and the calcium nickel phosphate material.

7. A catalytic mixture, as described in claim 2, wherein the calcium nickel phosphate material contains between 7.5 and 10.5 atoms of calcium per atom of nickel and is formed by precipitation from an aqueous solution of a soluble orthophosphate and soluble calcium and nickel salts in the presence of a basic nitrogen compound in amount such that the precipitation is completed at a pH value between 7 and 9, and wherein the chromium oxide is present in amount not exceeding 30 per cent of the combined weight of the same and the calcium nickel phosphate material.

8. A catalytic mixture, as described in claim 2, wherein the calcium nickel phosphate material contains between 7.5 and 9.2 atoms of calcium per atom of nickel and is formed by precipitation from an aqueous solution of a soluble orthophosphate and soluble calcium and nickel salts in the presence of ammonia in amount such that the precipitation is completed at a pH value between 7 and 9, and wherein chromium oxide is present in amount not exceeding 5 per cent of the combined weight of the same and the calcium nickel phosphate material.

EDGAR C. BRITTON.
ANDREW J. DIETZLER.

No references cited.